United States Patent [19]

Nelson

[11] 3,892,117

[45] July 1, 1975

[54] METHOD OF MANUFACTURING LIGHTWEIGHT DENTAL DRILL FOR HIGH-SPEED DENTAL HANDPIECE

[76] Inventor: Milton E. Nelson, 2302 Sandpiper Way, Pleasanton, Calif. 94566

[22] Filed: July 19, 1974

[21] Appl. No.: 490,000

Related U.S. Application Data

[63] Continuation-in-part of Ser. No. 345,482, March 28, 1973, Pat. No. 3,842,632.

[52] U.S. Cl. ................................... 72/367; 32/48
[51] Int. Cl. ............................................. B21k 5/02
[58] Field of Search ........ 72/76, 367; 32/48; 76/108

[56] References Cited
UNITED STATES PATENTS
2,227,817  1/1941  Allen ................................... 72/367
3,393,452  7/1968  Nelson ................................. 32/48

Primary Examiner—Lowell A. Larson
Attorney, Agent, or Firm—Warren, Rubin & Chickering

[57] ABSTRACT

A method of manufacturing a lightweight dental drill suitable for use with a high-speed, air turbine, dental handpiece is disclosed. The drill includes a hollow head portion, preferably an occlusal barrel or similarly shaped head, and an integrally formed hollow shank portion. A piece of metal tubing is selected to have an outside diameter at least about equal to the largest diameter of the head portion. The tubing is radially deformed, preferably by swaging, at one end to provide the shank and a first area of the head portion, and is radially deformed proximate a second end to provide a second area of the head portion. A reduction of the wall thickness of the radially inwardly deformed portions of the drill reduces the overall drill weight and enhances performance.

8 Claims, 5 Drawing Figures

METHOD OF MANUFACTURING LIGHTWEIGHT DENTAL DRILL FOR HIGH-SPEED DENTAL HANDPIECE

RELATED APPLICATION

This application is a continuation-in-part application of my co-pending application Ser. No. 345,482, filed Mar. 28, 1973, and entitled "METHOD OF MANUFACTURE OF LIGHTWEIGHT, HIGH-SPEED DENTAL DRILL," now U.S. Pat. No. 3,842,632.

BACKGROUND OF THE INVENTION

Modern high-speed, air turbine, dental handpieces are capable of operating at speeds of about 250,000 rpm to about 500,000 rpm. While these handpieces are capable of such optimum and highly desirable speeds, they will not retain the same if heavy dental drills are employed in the handpiece. This is particularly true of all large size, solid drills, and is especially true of enlarged drills such as the occlusal barrel drill. The occlusal barrel is, under proper rotational speed, capable of effecting rapid reduction of tooth surfaces and is normally utilized in the molar and bicuspid regions of the mouth. A solid occlusal barrel drill will, however, reduce the performance of the air turbine handpiece so substantially that the drill does not perform as well as smaller diamond drills of less desirable shape which rotate at high speeds or as well as carbide drills. Carbide drills, however, tend to fracture the enamel and also create excessive vibration and patient discomfort and trauma.

The occlusal barrel drill presents a relatively difficult manufacturing problem in that the advantages of this type of drill reside in having the head portion of substantially greater diameter than the drill shank. The manufacturing problem is not too great for solid occlusal barrel drills which are simply machined from solid stock with the head having a greater diameter than the shank. Carbide drills attempt to solve the manufacturing problem by attaching an enlarged head to a shank.

The excess weight of solid machined drills and two-piece carbide drills creates another problem. An eccentricity in the drill or the handpiece or the chucking of the drill in the handpiece results in vibration, which vibration is accentuated as the mass of the drill increases. Thus, lightening the weight of a large drill, such as the occlusal barrel, adds very perceptibly to the concentricity and smoothness of operation or dynamics of the drill, as well as to its speed.

Handpieces have been evolved which allow the injection of coolant, such as water, down the shank of the drill for discharge through the head onto the tooth surface as it is being abraded. Even if the handpiece does not provide for injection of coolant through the drill, a hollow drill head with openings therethrough will effect cooling by means of aeration of the tooth surface. Drills formed from solid stock are neither capable of aeration nor the discharge of coolant on the surface being abraded.

Accordingly, it is an object of the present invention to provide a method of manufacturing a dental drill which will allow the production of very lightweight, hollow drills having relatively enlarged head portions suitable for operation at air turbine handpiece speeds for rapid reduction of a tooth surface.

Another object of the present invention is to provide a method of manufacturing a dental drill which enables the production of a barrel-type drill through which coolant can be transmitted and discharged from the head portion thereof.

Another object of the present invention is to provide a method for manufacturing a dental drill having improved dynamic rotational properties.

Still a further object of the present invention is to provide a method of manufacture of a dental drill which is suitable for mass production of high strength drills at modest cost in a wide variety of shapes and sizes.

The method of manufacturing dental drills of the present invention possesses other objects and features of advantage, some of which will be set forth in the following description of the preferred embodiments of the present invention and are illustrated in the drawings accompanying and forming part of this specification. It is to be understood, however, that variations in the showing made by the drawings and description may be adopted within the scope of the invention as set forth in the claims.

DESCRIPTION OF THE PREFERRED EMBODIMENT

Figure 5:
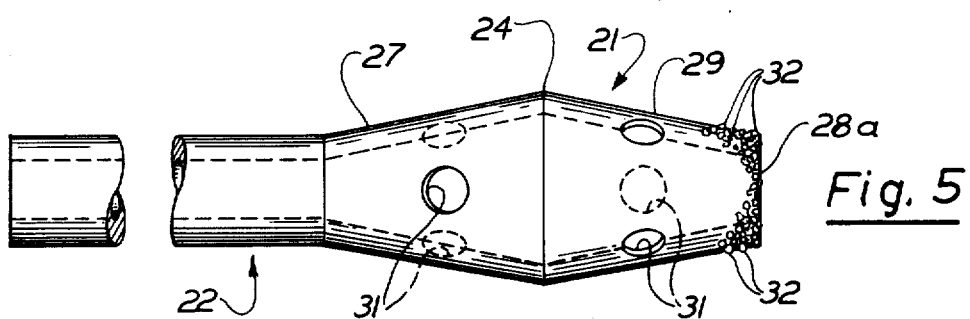
FIG. 5 is a longitudinal, elevational view of a dental drill formed from the tubing of FIG. 1 and in its final form.

The lightweight dental drill produced by the manufacturing method of the present invention can be seen in FIG. 5 as including a hollow head portion, generally designated 21, and an integrally formed hollow shank portion 22. The drill of FIG. 5 is an occlusal barrel-type drill in which head portion 21 includes working surfaces having a diameter substantially larger than the diameter of shank 22 so as to enable a rapid abrading or grinding of tooth enamel.

The method of manufacture of the present invention is comprised, briefly, of selecting a metal tubular member, generally designated 23, having an outside diameter in its initial or unformed state at least about equal to the largest diameter 24 (FIG. 5) of the head of the formed drill. Tube 23 further has an overall length at least about equal to, and preferably longer than, the length of the formed drill, and tubing 23 has a wall thickness sufficient to provide the necessary strength for the drill at diameter 24 for drilling at air turbine speeds. The method further includes radially inwardly deforming tubular member 23 proximate first end 26 to form shank portion 22 and to form a first area 27 of head portion 21. Area 27 extends from diameter 24 to shank 22 and slopes toward the shank portion. Finally, the tubing is radially inwardly deformed proximate a second end 28 to form a second area 29 of head portion 21 extending from large diameter 24 toward end 28 and sloping away from shank 22. Thus, in order to produce the lightweight hollow drill of the present invention, a tubing having a diameter equal to the largest diameter of the drill head is selected and then radially inwardly deformed to provide the shank and working areas or surfaces of the head.

Figure 1:
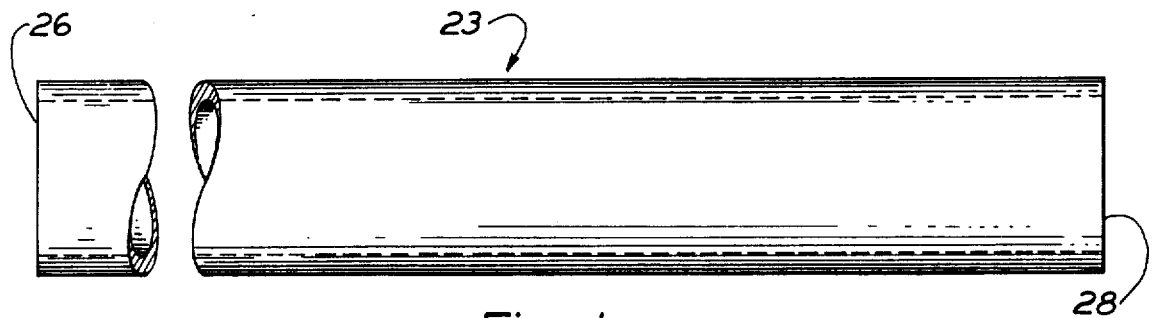
FIG. 1 is a longitudinal, elevational view of a piece of tubing illustrating the first stage of formation of a dental drill in accordance with the method of the present invention.
Figure 2:
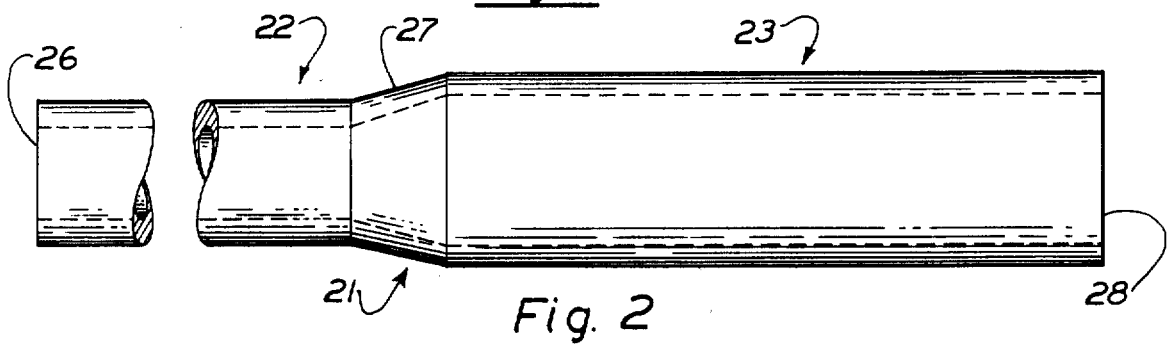
FIG. 2 is a longitudinal, elevational view of the tubing of FIG. 1 in an intermediate stage of formation of the drill.

The metal tubing best suited for use in the manufacturing process of the present invention is 304 stainless steel tubing which is readily commercially available. Such stainless steel tubing has the desired corrosion resistance and the necessary strength for high-speed operation. It is further preferred that the tubing be in an annealed condition to avoid overworking and cracking of the drill upon radial deformation. The inherent high strength of stainless steel tubing makes radial deformation somewhat difficult, but it may be accomplished by means of swage forming, for example, by use of a rotary swaging machine of the type shown in FIG. 1 of my above-referenced parent application. Swage forming is, of course, a known manufacturing technique (see, for example, U.S. Pat. No. 2,227,817) but its application and adaptation to the solution of the unique problems of the formation of miniature dental drills is new.

Figure 3:
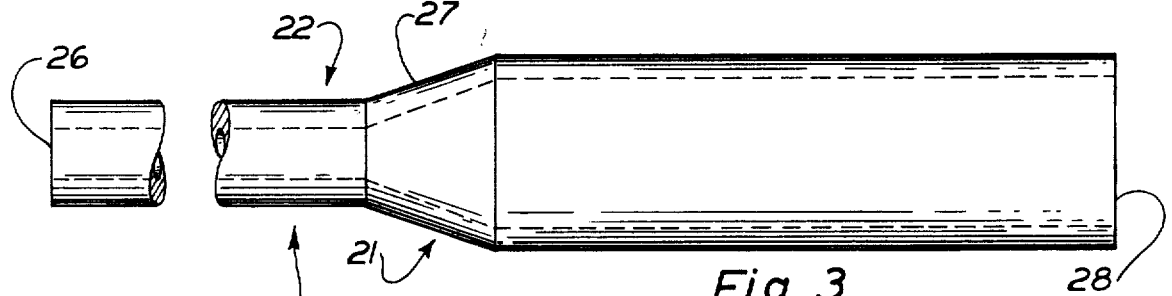
FIG. 3 is a longitudinal, elevational view of the tubing of FIG. 1 with the shank portion of the drill formed.

FIGS. 1 through 5 show the steps in a preferred order of manufacturing the dental drill of the present invention by rotary swage forming of stainless steel tubing. While the shank portion 22 is shown as being formed first, the method of the present invention can be accomplished by forming the so-called "second area" 29 of the head before forming the shank. It is preferable, however, that the tubing be gripped proximate end 28 so that first end 27 of the tubular member can be urged axially into swage forming means, such as a rotary swaging machine, to form shank 22. As shown in the drawings, the tubing is inwardly deformed by the swage forming machine through a series of stages. Thus, in FIG. 2, shank 22 is reduced in diameter slightly from that of the original diameter of tube 23 and a portion of first area 27 is formed. The tube is then withdrawn from the rotary swager and a second die placed in the swaging machine. FIG. 3 illustrates the next stage in which shank portion 22 has been further reduced and area 27 increased. Finally, in FIG. 4, the shank portion 22 has been inwardly deformed to substantially its final configuration, as has area 27.

During the entire formation of the shank and first area of the head of the drill, the length of tube 23 between area 27 and end 28 may be used to enable gripping of the tube 23 and urging of the same into the swaging dies. For this purpose, it is preferable that the length of the tubing be selected to be substantially greater than the length of the drill, with the length between the first area 27 and end 28 being greater than the length required merely for the second area 29 so that a good firm grip on the tubing can be maintained.

After forming the shank and first area, tubular member 23 can be removed from the swage forming machine and shank 22 gripped to enable axial urging of second end 28 into the swage forming dies. Again, in order to enable proper gripping of the tubular member during formation of second area 29, it is preferable that shank portion 22 be longer than would be required for the finished drill.

Figure 4:
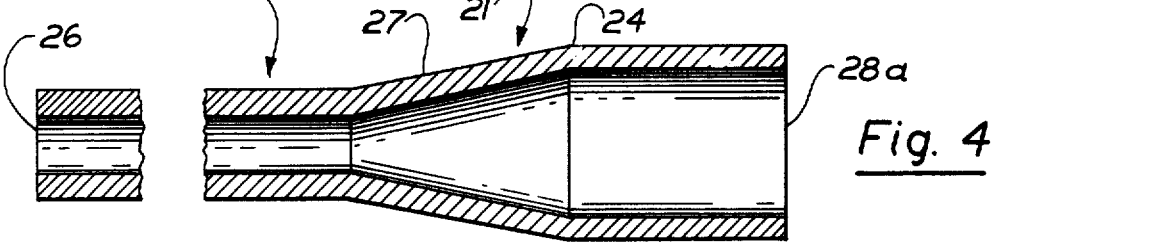
FIG. 4 is a longitudinal, elevational view, in cross-section, of the tubing of FIG. 1 in still a further stage of formation of the drill.

Since the tubing is longer in length proximate end 28 than is required for second area 29 of the head of the drill, it is preferable that the tubing be severed or parted at 28a to remove a portion of the tubing proximate end 28 and thereby define a length of tubing between first area 27 and end 28a about equal to the length of second area 29. Such a severed tube is shown in FIG. 4. The tube of FIG. 4 can then be urged into swage forming means to effect radial deformation and produce working surface or area 29. Depending upon the malleability of the tubing, formation of surface 29 may require a series of dies to deform the tubing through stages similar to those for surface 27. It should be noted, however, that this is not normally required, since there is no shank extending beyond end 28a.

In the event that it is desirable to form second area 29 before first area 27, the second end 28 of the tubing can be reduced in a manner similar to the first end with a shank-like section of tubing extending beyond area 29. This section can be gripped and used to hold the tubing during subsequent formation of the shank and first area 27, after which the shank-like section of tubing beyond second area 29 can be parted or severed from the drill.

After formation of the shank and head, the drill can be finished by plunge grinding (centerless grinding) shank 22 and machining the exterior surface of area 27 and area 29 to true-up and insure dynamic balance of the drill. The end 28a can also be machined to provide a uniform end on the drill. Additionally, coolant discharge openings 31 may be formed in one or both of areas 27 and 29 for discharge onto the working surfaces of the drill. (See, for example, my U.S. Pat. No. 3,393,452 for other possible hole patterns.) As will be seen, the barrel-type drill also is formed with an axial opening at end 28a. Finally, embedded in an adhesive matrix are a plurality of abrasive particles 32, such as diamond chips or the like, which provide the necessary cutting capability for the drill.

In order to enable machining of the exterior surfaces of the drill to true-up the same, and further in order to allow formation of coolant discharge openings 31 and securement of abrasive particles 32 to the drill, it is preferable that shank 26 be somewhat in excess of the length of the finished drill so that the drill may be firmly gripped during the finishing steps. After the abrasive particles are affixed to the drill, the excess length of shank portion 22 can be parted or severed from the drill to reduce the shank to the desired overall length.

As will be apparent, the radial inward deformation of tube 23 will cause an increase in the wall thickness of the tubing, as well as some increase in the overall length of the tubing. Since the tubing is selected so that the wall thickness is sufficient to withstand rotational forces at large diameter 24 of the head portion, other portions of the drill may have a thickness greater than would be required merely to withstand rotational forces. Shank 22, for example, will have a substantially thicker wall than head portion 21 at diameter 24. The shank, however, is subjected to the inward gripping forces of the chuck of the handpiece. Accordingly, depending upon the handpiece, the additional wall thickness in shank 22 may be highly desirable. Moreover, this thickness is at a relatively small diameter and thus the moment of inertia of the drill is not adversely increased to a substantial degree. It is possible, however, depending upon the gripping forces of the handpiece, to reduce the wall thickness of tubular member 23 in shank portion 22 to thereby effect a further reduction of weight of the drill, which will enhance performance.

This reduction of the wall thickness can be accomplished either before or after radial reduction of the tubular member to form shank 22. As described in my above-referenced parent application, the wall thickness can be reduced by machining the exterior surface of the tubing or by drilling out a portion of the tubing from the interior surface. The latter technique is preferred in the barrel-type of drill shown in the drawing. If desired, the wall thickness of the head portion can also be reduced in areas which are inwardly deformed to any substantial degree.

As shown in the drawing, areas 27 and 29 of the occlusal barrel drill are provided by frusto-conical surfaces. As will be apparent, areas 27 and 29 could be defined by oppositely sloping arcuate surfaces. Other configurations are also possible and instead of frusto-conical surfaces 27 and 29 meeting at a common base 24, a cylindrical section of tubing might be interposed between the bases of the oppositely sloping surfaces.

The manufacturing process of the present invention allows the formation of a dental drill having an enlarged head on which there are working surfaces which slope or face in opposite axial directions. This rather difficult manufacturing problem is accomplished by swage forming the tube from a first end and then gripping the first end to swage form the second end of the tube. The result is a hollow, and accordingly lightweight, dental drill which can achieve and maintain the very high air turbine handpiece rotational speeds. Thus, the advantage of a fast reduction of tooth surface by reason of the large diameter of the drill head (e.g., 0.125 inches as compared to a shank diameter of 0.062 inches) can actually be realized. Moreover, the heat generated by rapid reduction of the tooth surface can be dissipated by discharge of coolant through the barrel head of the drill, allowing the dentist to obtain the full benefit of modern handpieces.

What is claimed is:

1. A method of manufacturing a lightweight dental drill suitable for use with a high-speed, air turbine, dental handpiece, said drill having a hollow head portion and an integrally formed hollow shank portion, comprising the steps of:
   a. selecting a metal tubular member having:
      i. an outside diameter at least about equal to the largest diameter of said head portion in the formed drill;
      ii. an overall length at least about equal to the length of the formed drill; and
      iii. a wall thickness sufficient to provide the necessary strength as said largest diameter of said head portion for drilling at air turbine speeds;
   b. radially inwardly deforming said tubular member proximate a first end thereof to form said shank portion and to form a first area of said head portion extending from said largest diameter of said head portion to said shank portion, said first area sloping toward said shank portion; and
   c. radially inwardly deforming said tubular member proximate a second end thereof to form a second area of said head portion extending from said largest diameter of said head portion toward said second end and sloping away from said shank portion.

2. A method of manufacturing a lightweight dental drill as defined in claim 1 wherein,
   said deforming steps are accomplished by first gripping said tubular member proximate said second end and axially urging said first end of said tubular member into swage forming means to form said shank portion and said first area; thereafter removing said tubular member from said swage forming means; and thereafter gripping said shank portion and axially urging said second end into swage forming means to form said second area.

3. A method of manufacturing a lightweight dental drill as defined in claim 2 wherein,
   said tubular member is selected to have a length substantially greater than the length of the formed drill, said shank portion and first area being formed at a position along said tubular member leaving a length of said tubular member between said first area and said second end greater than the length of said second area to enable gripping of said tubular member during formation of said shank portion and said first area, and said shank portion being formed of a length greater than the length of said shank portion of the formed drill to enable gripping of said tubular member by said shank portion during formation of said second area.

4. A method of manufacturing a lightweight dental drill as defined in claim 3 and the step of:
   severing said tubular member to remove a portion thereof proximate said second end to define a length of said tubular member between the position of severing and said first area about equal to the length of said second area, said severing step being accomplished before formation of said second area.

5. A method of manufacturing a lightweight dental drill as defined in claim 4, and the steps of:
   machining and plunge grinding the exterior surface of said drill after said radial deforming steps to insure dynamic balance of said drill; forming at least one opening in at least one of said first area and said second area; and as a last step severing said shank portion proximate said first end to reduce said shank portion to the desired overall length.

6. A method of manufacturing a lightweight dental drill as defined in claim 1 and the step of:
   reducing the wall thickness of said tubular member to a thickness sufficient to provide the necessary strength in the formed drill for operation at air turbine speeds.

7. A method of manufacturing a lightweight dental drill as defined in claim 1 wherein,
   said first area and said second area are each formed as frusto-conical surfaces.

8. A method of manufacturing a lightweight dental drill as defined in claim 7 wherein,
   said frusto-conical surfaces meet at a common base at the largest diameter of said head portion.

* * * * *

UNITED STATES PATENT OFFICE
CERTIFICATE OF CORRECTION

PATENT NO. : 3,892,117
DATED : July 1, 1975
INVENTOR(S) : Milton E. Nelson

It is certified that error appears in the above-identified patent and that said Letters Patent are hereby corrected as shown below:

Column 2, line 1, after "barrel-type" insert

---dental---.

Column 3, line 33, change "27" to ---26---.

Signed and Sealed this second Day of December 1975

[SEAL]

Attest:

RUTH C. MASON
Attesting Officer

C. MARSHALL DANN
Commissioner of Patents and Trademarks